C. V. PETTIBONE.
WHEEL.

No. 109,447. Patented Nov. 22, 1870.

Witnesses:
Chas. Nida
Geo. W. Mabee

Inventor:
C. V. Pettibone
Per ——
Attorneys.

United States Patent Office.

C. VALLETTE PETTIBONE, OF FOND DU LAC, WISCONSIN.

Letters Patent, No. 109,447, dated November 22, 1870.

IMPROVEMENT IN WHEELS FOR VEHICLES.

The Schedule referred to in these Letters Patent and making part of the same.

*To all whom it may concern:*

Be it known that I, C. VALLETTE PETTIBONE, of Fond du Lac, in the county of Fond du Lac and State of Wisconsin, have invented new and useful Improvements in Vehicle Wheels; and I do hereby declare that the following is a full, clear, and exact description thereof, which will enable others skilled in the art to make and use the same, reference being had to the accompanying drawing forming part of this specification.

My invention has for its object to provide improved means to facilitate the rolling of carriage and wagon-wheels over railroad-rails or other obstructions, in diagonal lines, and more especially to facilitate turning away from the tracks when running upon them. To this end My invention consists in providing an ordinary carriage-wheel with a supplemental rim, notched upon opposite edges, and adapted to be fitted over the ordinary tire.

I am aware that pins or projections have been formed upon the fellies of wheels for this purpose, and I am also aware that the ordinary tire of a wheel has been notched upon opposite sides, corresponding to notches formed in the sides of the fellies. These methods of accomplishing the desired object form no part of my invention, and are objectionable for the following reasons:

The pins or projections upon the sides of fellies being removed a short distance from each other, are independent, and as they must be made small in size in order not to destroy the symmetry of the wheel are liable to become broken, and therefore destroy the efficiency of the wheel.

When the tires and fellies are both notched, it is evident that the wheel is materially weakened and unable to sustain the load for which it was originally constructed.

The fellies and tire are made to resists a predetermined pressure or weight, and if they are cut away to accomplish a result not contemplated when first made, the wheel must necessarily be weakened and injured. On the other hand, to compensate for the decrease in material, the fellies and tire must be made of unusual size, and therefore become clumsy and unwieldly.

By my improvement, these objections are overcome, as I propose to employ an additional band, notched upon opposite edges, to be placed over the ordinary tire, thereby strengthening the latter to such an extent that the fellies and tire may be reduced considerably in size.

Another advantage arising from my improvement consists in the capacity of the supplemental rim for removal from the tire, when it becomes worn, that its place may be supplied with a new one, without in the least injuring or impairing the efficiency of the tire and fellies.

Inasmuch as the supplemental rim can be constructed at much less expense than an ordinary wheel tire, this adaptation for removal becomes of much importance in the cost of constructing carriage-wheels.

Similar letters of reference indicate corresponding parts.

In the accompanying drawing—

Figure 1:
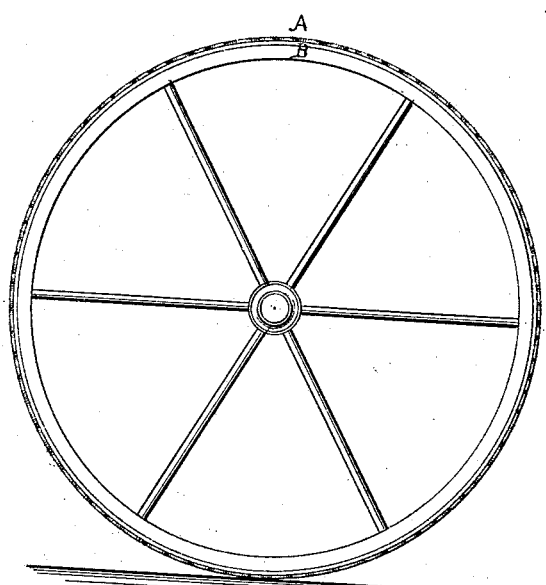
Figure 1 is a side elevation of a wheel provided with my improvement.
Figure 2:
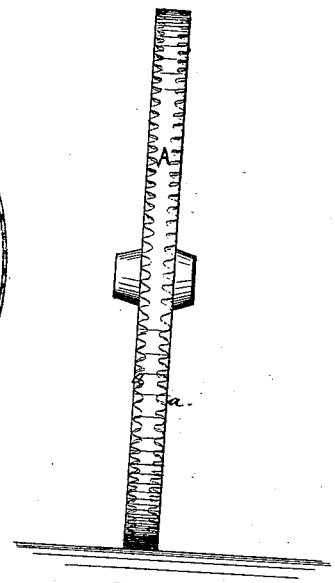
Figure 2 is a front elevation of the same.
Figure 3:
Figures 3 and 4 represent cross-sections of the supplemental rim applied to the tire.
Figure 4:

B is the ordinary tire of a carriage or wagon-wheel applied to the fellies in the usual manner.

A is the supplemental metal rim, provided upon opposite edges with notches *a*, as shown, and shrunk upon or otherwise secured to the smooth tire B.

If desired the notches *a* need not be made entirely through the supplemental rim A, but may form indentations upon its outer edges, and may be greater or lesser in size, as preferred.

The rim should be so attached to the tire that it can be removed with facility when worn out, and may be composed of wrought-iron, or made of steel, and hardened.

When wheels of this construction run diagonally against railroad-rails, the notches *a* will engage the corner of the rails, and the wheels be rolled over, instead of slipping along the rails, as they do now of the great danger of the vehicle and the increase to the draft of the same.

Having thus described my invention,

What I claim as new therein, and desire to secure by Letters Patent, is—

The notched supplemental rim A, in combination with the ordinary tire and fellies of a carriage or wagon-wheel, as herein described, for the purpose specified.

C. VALLETTE PETTIBONE.

Witnesses:
H. C. WILLS,
C. J. PETTIBONE.